(12) United States Patent
Fairey, Sr. et al.

(10) Patent No.: US 9,053,147 B2
(45) Date of Patent: Jun. 9, 2015

(54) ADDRESS-BASED HISTORICAL DATA RESEARCH TOOL

(71) Applicant: Architectural Forensics, LLC, Rock Hill, SC (US)

(72) Inventors: Wade B. Fairey, Sr., Rock Hill, SC (US); James I. Robinson, III, Rock Hill, SC (US)

(73) Assignee: ARCHITECTURAL FORENSICS, LLC, Rock Hill, SC (US)

( * ) Notice: Subject to any disclaimer, the term of this patent is extended or adjusted under 35 U.S.C. 154(b) by 39 days.

(21) Appl. No.: 13/632,552

(22) Filed: Oct. 1, 2012

(65) Prior Publication Data

US 2013/0262506 A1 Oct. 3, 2013

Related U.S. Application Data

(60) Provisional application No. 61/542,110, filed on Sep. 30, 2011.

(51) Int. Cl.
 *G06F 17/30* (2006.01)
(52) U.S. Cl.
 CPC .............................. *G06F 17/30424* (2013.01)
(58) Field of Classification Search
 USPC ....................................................... 707/707
 See application file for complete search history.

(56) References Cited

U.S. PATENT DOCUMENTS

2007/0061424 A1* 3/2007 Mattaway ..................... 709/219
2012/0302256 A1* 11/2012 Pai et al. ..................... 455/456.2
2013/0036031 A1* 2/2013 Hutchinson .................... 705/30

OTHER PUBLICATIONS http://web.archive.org/web/20100927184734/http://search.ancestry.com/search/category.aspx?cat=37.*
http://web.archive.org/web/20100831101425/http://search.ancestry.com/search/category.aspx?cat=43.*

* cited by examiner

*Primary Examiner* — Etienne Leroux
*Assistant Examiner* — Cindy Nguyen
(74) *Attorney, Agent, or Firm* — Oliff PLC; R. Brian Drozd

(57) ABSTRACT

A method, device and computer program product for address-based historical records research includes receiving input of an address in researching history of persons. In response to receiving the address input, querying, using a computing device, a database to determine if any information is associated with the address, the database comprising information including, for example, names of people who were associated with the address, historical pictures of the address, and community information about the address. In response to locating address data about the inputted address in the database, retrieving the address data and outputting the address data.

16 Claims, 5 Drawing Sheets

ADDRESS-BASED HISTORICAL DATA RESEARCH TOOL

CROSS-REFERENCE TO RELATED APPLICATIONS

This application claims the benefit of U.S. provisional patent application Ser. No. 61/542,110, filed on Sep. 30, 2011 and entitled "Address-Based Historical Data Research Tool," which is hereby incorporated by reference as if set forth verbatim herein and relied upon for all purposes.

BACKGROUND

People desire to research information about their history and family. People routinely use a family name to conduct such research. However, many times, memories are not built on the family name and therefore such search may not reveal much information (if any) on family, events, insights and local history details. The family name may only be important to the descendent(s) but does not provide information about the person's community, socio economic information, day-to-day life information of that person, and such information may be information that people would like to know about others. Merely searching by someone's name does not provide a real image about that person. It is therefore, not necessarily the family name that is important in establishing community data.

BRIEF SUMMARY

To address the above issues, the present disclosure provides a means to give a full image about a person using that person's address/structure rather than that person's name. In this regard, it is the physical address/structure which memories are built on and therefore reveal far greater information on family, events, insights and local history details. The image and physical address links not only the family descendents but all those individual families who have resided at that particular location as well as those who have any associated memories of what happened at that address. The image of a physical structure at a particular address, at a particular time is the mechanism best used to explore and record data, events, family lore, and community histories. The image of a physical structure such as a home, business, school, club house, etc., is the object of connectivity linking the artisans who built it, the architect who designed it, the contractor who built it, the employees who managed it, the family residing there, the renter or patrons who visited that particular location or the students who attended school in the structure. Individually they have separate recollections but it is their collective memories associated with the image of that particular address/structure that tells the complete story and history. Therefore, the image of a specific structure and physical address becomes the central focus of our memories and is a valuable research tool highly useful in collecting history.

According to one aspect of the present invention, a method for address-based historical records research includes receiving input of an address in researching history of persons. In response to receiving the address input a computer querying a database to determine if any information is associated with the address. The database may include information such as, for example, names of people who were associated with the address, historical pictures of the address, and community information about the address. In response to locating address data about the inputted address in the database, the server retrieves the address data and outputs the address data.

According to another aspect of the present invention, a system for address-based research comprises a records database and a computer hardware processor in communication with the records database. The processor is configured for receiving input of an address in researching history of persons and querying the records database to determine if any information is associated with the address exists in the records database. The database may include names of people who were associated with the address, historical pictures of the address, and community information about the address. The processor is further configured for retrieving the address data and outputting the address data in response to locating address data about the inputted address in the database.

BRIEF DESCRIPTION OF THE SEVERAL VIEWS OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
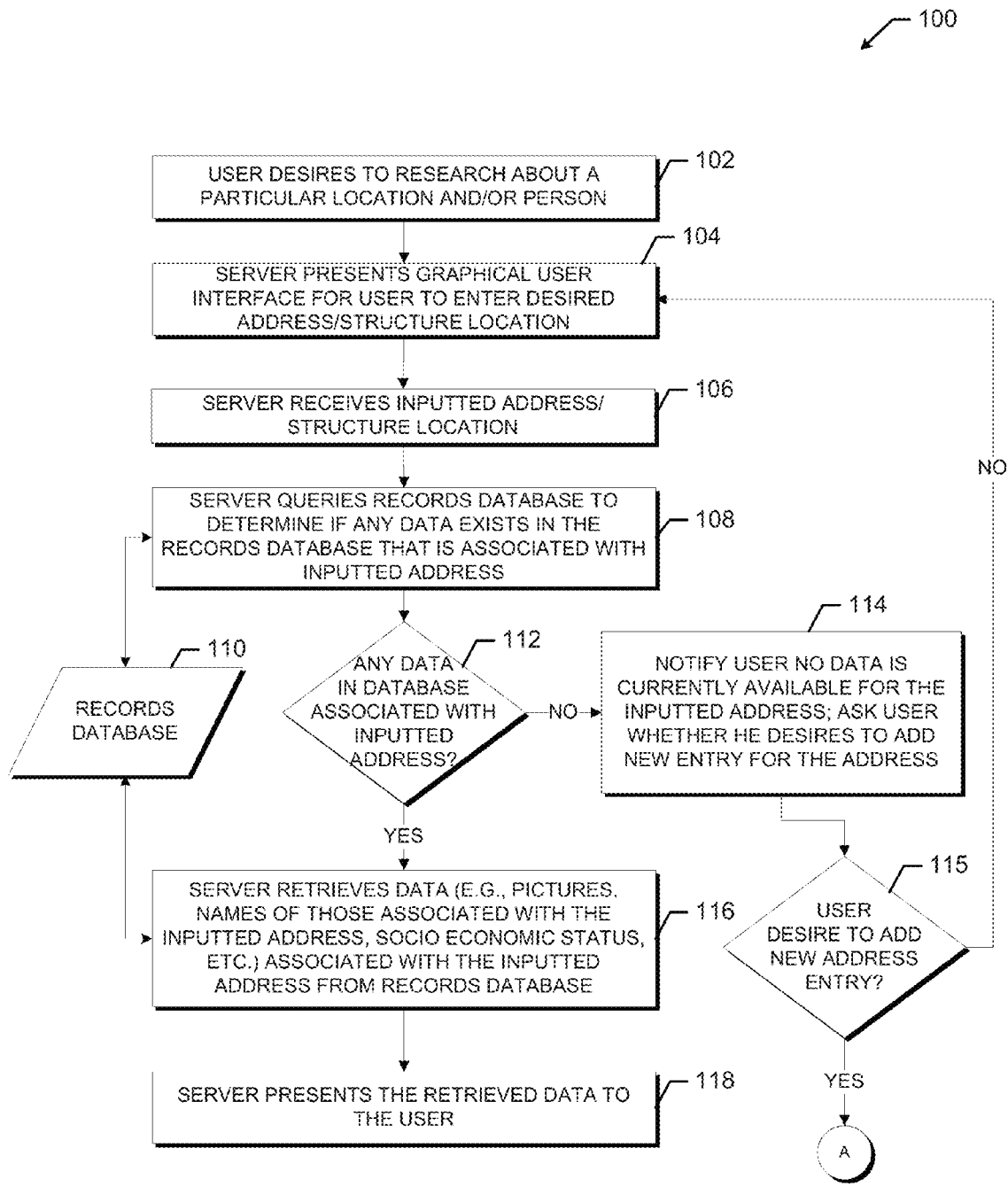
FIG. 1 is a flowchart of an example of a method for retrieving address-based historical records in accordance with an embodiment of the present invention.

As briefly mentioned above, the image of a physical structure at a particular address, at a particular time is the mechanism best used to explore and record data, events, family lore, and community histories. The image of a physical structure such as a home, business, school, club house, etc., is the object of connectivity or memories linking the artisans who built it, the architect who designed it, the contractor who built it, the employees who managed it, the family residing there, the renter or patrons who visited that particular location or the students who attended school in the structure. Individually, they have separate recollections but it is their collective memories associated with the image of that particular address/structure that tells the complete story and history. Therefore, the image of a specific structure and physical address becomes the central focus of our memories and is a valuable research tool highly useful in collecting history.

In light of this, the present disclosure presents various systems, methods, and computer program products that provide a means for historical data research based on an inputted address. As will be discussed in more depth below, a user will locate and input an address, and a history of that address/structure will be generated through linking the address to photographs, documents, local histories, genealogy, and memories submitted by individuals including genealogy associated with that particular structure, etc. By using the address, a user can look up a history of whoever is associated with that house at a particular address without knowing the family(s) associated with the address. It is the image of the structure and address of said structure which links memories and materials. The photographs show an evolution of the structure which links to intergenerational memories of the family. In other embodiments, a user can create a new entry and profile of an address and upload data about such address, such as the historical pictures of the property, the people who lived at the address, any pertinent audio, community facts and pictures, or the like.

Two examples to illustrate these concepts are now presented:

Example 1

If a user is asked to recall something of his grandfather, he first recalls the structure in which the grandfather resided, the street on which he lived, his profession, and his community activities. It is, therefore, the image of the structure in which the grandfather lived, (often more than one image) and physical address which reflects most accurately on his history, not his family ties. In much the same manner, if a descendent has an historic post card belonging to his ancestor, the researcher can look up the exact address and image of his grandfather's home. It is this image that reveals far more insight of his grandfather, than does his parent's lineage or what military branch he served. Accordingly, the image of his residence reveals his socio economic well being and his expectations of himself. The image again stimulates memories of whom the real person was who lived in that particular structure, at a special time and had his own image of himself which was reflected through the image of his living quarters.

Furthermore, the image which a "granny" fostered to the community around her may have been heavily reflected by the structure in which she resided. Therefore, when we think of "granny," it is her home, not her photograph, which is most often recalled. The memories of her cannot be separated from the structure in which she resided. She controlled, even after her death, the manner in which people relate to her through what structure(s) she resided, where she shopped, what her church looked like in which she worshipped, etc. It is the structure and the image of that structure(s) that is just as much the relevant and revealing thread as is the family blood ties that embellish our fondest memories. For it is the image of the structure, when studied, reveals far greater insight and historic information on the life of the individual than do family genealogy charts.

Example 2

It is the image of the individual structure/address which is the glue connecting us to community and social events. The Woolworth 5 & 10 building in downtown Rock Hill, S.C., for example, was a central focus of national history and community history. When the Friendship Nine, a group of African American students from Friendship College, held their famous sit in at the lunch counter, it is the image of the Woolworth building which is the common tie and becomes the central link between the African American students, the white ladies working at the lunch counter, the police who arrested them and the NAACP pushing the limits of social change. It is the building which is the face of the event which shaped the community. Whereas very few people knew it was the Rev. Ivory, who was pushing the students or the names of the students; it is the "place/address" in time that is important in our memories. The image of the Woolworth Building, at a particular time is the mechanism best used to explore and record events, family history and community histories. The physical image and address drive "collective" and intertwining memories that would otherwise remain individual memories of little historical value. But when ten people look at the image of the Woolworth Building, ten memories are recalled from ten different experiences dealing with the one image. It is therefore, the image of the physical address that is most useful in revealing local history data.

Various embodiments with reference to the Figures will now be discussed.

FIG. 1 is a flowchart of an example of a method 100 for a server retrieving address-based historical records in accordance with an embodiment of the present invention. In block 102, a user desires to research about a particular location and/or genealogy associated with such location. The location that the user desires to research may be associated with historical data about the address, photographs, documents, community history, memories submitted by individuals including genealogy associated with that particular structure, and other data as discussed below.

In block 104, a server presents a graphical user interface ("GUI") to the user. The GUI may present a box that allows the user to input a physical address of a location. In one embodiment, the GUI allows the user to narrow the search by presenting selectable options, such as selecting the country, state, county, township and/or city. For example, the user can select "USA," "South Carolina," "Greenville County," and then "Simpsonville" for a search for addresses in Simpsonville, S.C. The GUI may allow the user to search via a graphical map that presents an icon for each address (noting which addresses have historical data available for viewing). The user may then browse the interactive map and click on the address of the user's choice. In one embodiment, a GPS device (e.g., a smartphone) may gain the user's current location and input the address closest to the user's current GPS coordinates. It should be noted that the address need not be a mailing or postal address and instead could simply be any location where a structure is (or was) located, where such structure may not have (or have had) a mailing address. The GUI will be discussed in more depth later with regard to FIG. 5.

In block 106, the user enters/selects and transmits the address or structure location (hereinafter "the address input") to the server. This address input may be entered or selected through the GUI on the user's computing device as mentioned above. The address input may then be transmitted from the user's computing device over a network to the server, as is discussed in more depth with respect to FIG. 5. It should be understood that the present disclosure should not limit a user to have to input an address. Instead, the user can navigate a map to locate the address or the user can narrow a search by inputting various narrowing criteria. Such narrowing criteria could be who an architect/builder of a structure is (and the database will list recorded architects and builder in community), the last name of a person (e.g., Jones) who lived at a location (and the database will list every Jones in database with their known address), or some Boolean search.

When the server receives the address input from the user, the server may query a records database 110 to determine if arty data exists in the records database 110 for the inputted address, as shown by block 108. The query results are sent back to the server, and the server determines whether data associated with the input address exists in the records database 110. If the server determines, in block 112, that the records database (or other database) has data, associated with the inputted address, the method 100 may continue to block 116, which is discussed below. However, on the other hand, if the server determines, in block 112, that the records database (or other database) does not have data associated with the inputted address, the method may proceed to block 114.

In block 114, the server notifies the user that there is no stored data associated with the inputted address, but may ask the user (via a GUI) if the user would like to create a new entry and stored data with such newly created entry. The user may then provide an indication as to whether the user desires to add a new entry in the database. As illustrated in block 115, the server determines as to whether the user desires to add a new address entry (e.g., by receiving input from the user). If the user does not indicate a desire to create a new entry, the method may return to block 104. However, if the user does indicate he wants to create a new address entry (such as by simply uploading data, to the server associated with the address), the method 100 may proceed to reference point "A" in FIG. 1 (which directs method 100 to continue to block 408 of FIG. 4 which is discussed later with the discussion of FIG. 4).

As stated above, if the determination in block 112 is that the records database (or other database) has data associated with the inputted address, the method 100 may continue to block 116. In block 116, the server may access data in the records database 110 associated with the input address in response to determining that data, exists for the inputted address. The data may be retrieved using a database access program and the data is transmitted electronically from the records database 110 to the server where it may then be stored into the server's memory prior to transmission to the user. It should be understood that the address data, as used herein, may be any data that is stored and associated with the address, such as photographs, documents, local histories, genealogy, memories submitted by individuals including genealogy associated with that particular structure, textual historical information, artisan information, other associated addresses, etc. Further details about the type of data and examples thereof will be discussed later with regard to FIG. 2.

In block 118, the server presents the retrieved data to the user. The data may be presented from the server to the user visually, such as on a computer monitor or a smart phone display, or audibly, such as via speakers on a computing device. Regardless, a graphical user interface, such as the GUI that the user entered/selected the inputted address, may present the retrieved data to the user.

The server transmits the data to the user electronically to a user's computing device connected to any network. Such transmission may occur wirelessly, such as over a cellular network, or via a wired wide area network ("WAN"). For example, a user may be on a computer that is connected to the Internet and, after entering a valid address that is uploaded to the server, the server transmits data associated with the inputted address over a network via a transmission means (e.g., internet frequencies on DSL, cable lines, satellite internet, etc.) to a user. Alternatively, a user may be located at an address and request via a cellular phone (e.g., a smart phone) more information about that address using an application on his phone and the information may be transmitted over a cellular network to the user's phone.

It should be understood that the data related to the inputted address may be linked to data for another address and thus, the present disclosure allows for addresses to be linked in a tree-like fashion. For example, if a user determines, through the address-based historical research tool, the name of the builder of the inputted address, other addresses that the builder also built (or was associated with) could also be presented to the user. In this regard, the user can drill down to addresses that may be related via some connection (e.g., in this case the builder is common to all addresses). Various other commonalties between an inputted address and any other address via the data could be possible such that the other addresses could be presented to the user if there is some commonality therebetween.

Figure 2:
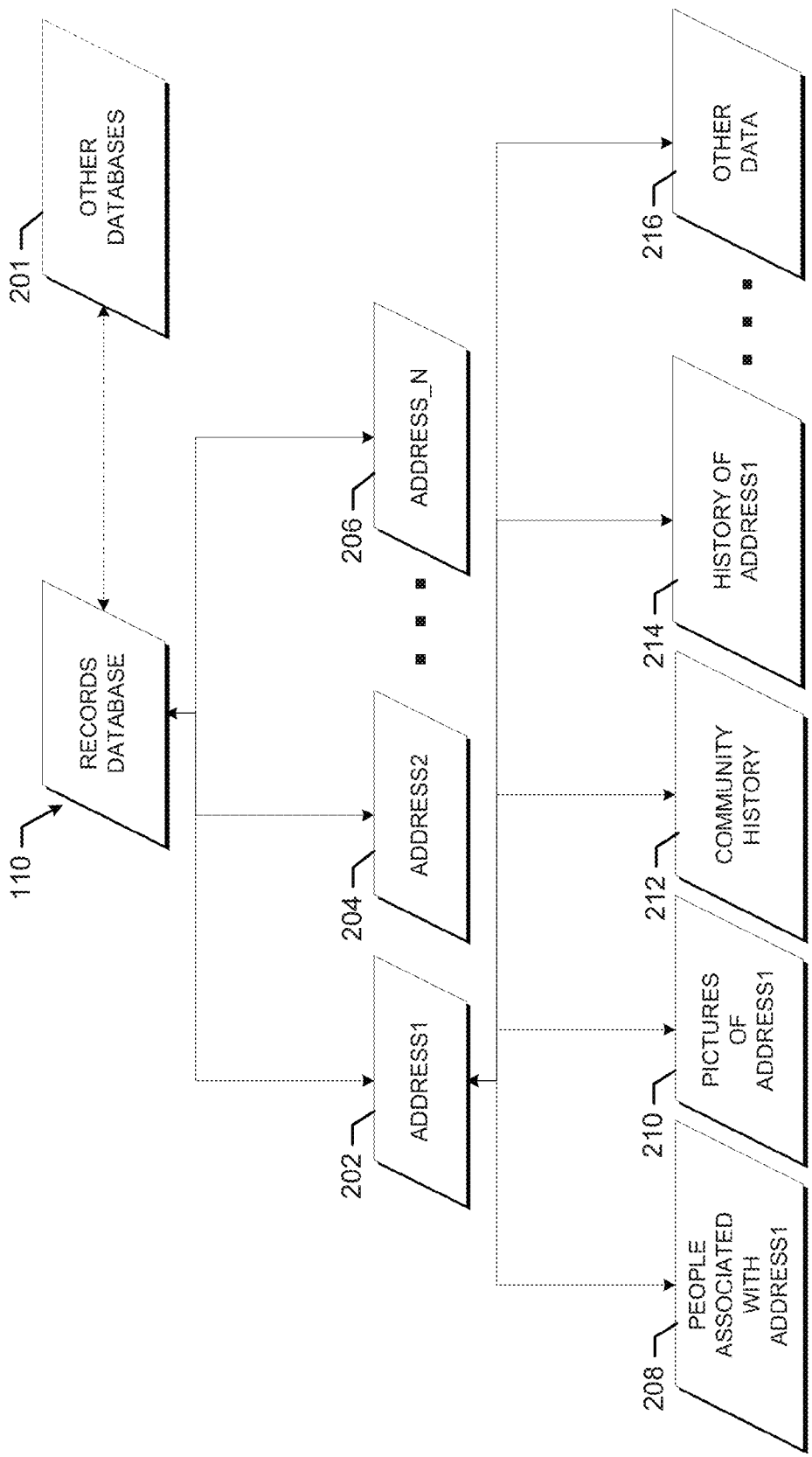
FIG. 2 is a block schematic diagram of the records database of the address-based historical records management system in accordance with an embodiment of the present invention.

FIG. 2 is a block schematic diagram of the records database 110 of the address-based historical records management system in accordance with an embodiment of the present invention. The records database 110 is substantially the same as described with respect to FIG. 1, according to an embodiment. The records database 110 may be a single database or may be a series of databases or may be in communications with other databases 201. Regardless, as illustrated in FIG. 2, the records database may include various database entries 202, 204, 206 associated with a specific address or structure. For example, as illustrated, the records database 110 may include address1 202, address2 204, and any number of additional addresses up to "n" amount of addresses so that the last address is address_n 206. Therefore the records database 110 may be any number of addresses.

In each address entry, any amount of data may be associated or stored for each address entry. For ease of reference, FIG. 2 illustrates various data 208, 210, 212, 214, 216 for the address1 entry 202 in the records database 110. The address1 entry 202 may include information about people associated with address1 208 (hereinafter "people data"). For example, the people data 202 may be documents, photographs, audio, letters, job information, and other information about people who were associated with the address. Examples of people who were associated with the address may be those people that lived (and/or are living) at the address, those who worked (and/or are working) at the address, those who worked on building structures at the address, the neighbors and the community members relative to the address, and the like. The people data may show how the people associated with the address are related to other people, such as the user. For example, a genealogy chart may be presented showing the resident of the address and his/her family tree.

Other data that can be included in records database 110 includes: name and history of the neighborhood associated with the address; neighborhood scenes (e.g., historic view of the street as seen by ABC and recorded by DEF); city directories (tools to link individuals to streets and businesses); street vistas—(e.g., development maps, etc.); post cards which would be a source of historic information on houses and streets; tags and indexing that allows the linking of images associated with specific builders, home owners, events; written histories of the community (e.g., newspaper articles on events or development of the area in which a structure was built, published history books, pamphlets, images of cemetery stones, obituaries, etc.); a brief history of architecture, street development, construction, etc.; recorded businesses and or individuals associated with structure; city directory information (if available) (using character recognition software have a listing of city directory information available for that specific address or type it manually); insurance maps (if available) (using diagrams of the structure, show a progression of potential changes over a range of years); documents associated with structure or street (development maps, architectural plans, letterheads, advertisements, etc.); neighborhood images (street vistas, etc.); builder, owner, individuals associated with property such as owners, renters, staff, etc.; bank of pictures from a specific address or institution such as a school, industry, etc.; community bank of pictures associated with the community in general but unnecessary for use in documenting specific structure;

The data may also include the name of the architect, builder, owner, occupants, etc. Every house known to have been constructed by Person A would be linked via the structure or if an owner moved six times or owned four buildings in two different cities, they would be linked in records database 110 through an index. Accordingly, if someone moved from 123 Oakland Ave., in City A, S.C. to 1600 N. Blvd., City B, S.C., the two structures would be tagged to a common index link in records database 110 and the person(s) associated with the two structures. In this manner, an architect moving from one city to the other can have all the properties they designed linked to tell a history of their contributions. Alternatively, someone living in five different locations in the same city could be easily tracked as they move.

The data may also include an open forum link to share their memories and history. This would allow community input via email by joining a forum by creating a user ID via the website, etc. Each user can share photographs of the structure, share memories of living here, share family genealogy associated with the structure (e.g., share grandmother's picture who once lived at that address either as a renter or owner), etc. Anyone can join in and tell their memories of what happened at ABCD address on any specific date or time. This allows users to submit data containing memories, such as documents and photographs, for inclusion on the post pertaining to a particular address, school, neighborhood, etc. or solicit that other post to the community bank of pictures related to such address.

The data could also be audio or video data, such as an oral history of someone discussing the history of the address. This may be performed by a person giving a personal interview about a house/structure, community, events, memories, persons associated with the address and storing that oral history to a third party server, such as imapbuilder.com, flikr.com, youtube.com, or any other site, which would be accessible to the system's server. This oral history information could be set as private and only accessible to authorized users of the system. The user may also or alternatively upload the audio or video data directly to the system's server.

The address1 entry 202 may further include pictures of address1 210 (hereinafter "picture data"). The picture data 210 would show any photographs or pictures associated with the address, such as a current picture of the structure(s) located at the inputted address, historical photographs of the address and the evolution of the structure(s) at the inputted address, photographs of past events (e.g., weddings, festivals, family gatherings, parades, pictures of the address if the address is a company/farm/factory, etc.) associated with the address or structure or associated with the surrounding community, and the like.

The address1 entry 202 may further include community history 212. The community history data 212 may be any information relating to people associated with the address and their role in the community, such as the occupation of the person residing or working the address or location, any community positions (e.g., governor, mayor, volunteer fire chief, etc.) that people associated with the address held or performed. This will give the user a glimpse into memories or events that happened to those who lived or worked at the address. Other community history data 212 could be information about organizations that the people associated with the address were a part of, such as the church they attended (or which church was closest), the schools that the people attended (or was closest in proximity), the clubs that the people were a part of, and the like. The community history data 212 could also list the friends and acquaintances of the people associated with the inputted address.

The address1 entry 202 may further include data revealing history of address1 214. This data would provide the user with historical information related to the address, such as if the address is located on land that was used in the civil war, the history of address as far as the evolution of the community and structure related to the inputted address. This data could be linked with other data to provide information of how people associated with the address fit into such history. For example, if the address is located proximate to a key battle in the civil war, the records database 110 may indicate that a person residing at the address named John Smith was a leader in the army that fought in that war and used his address as a battle station.

It should be understood that various other data 216 may also be included in the address1 entry. For example, the other data 216 can be data information about the neighboring structures, the make-up of the community, audio uploaded that relates to memories of persons associated with the address, and any other data. Additionally, all other address entries 204-206 can include data similar to address1 202.

Figure 3:
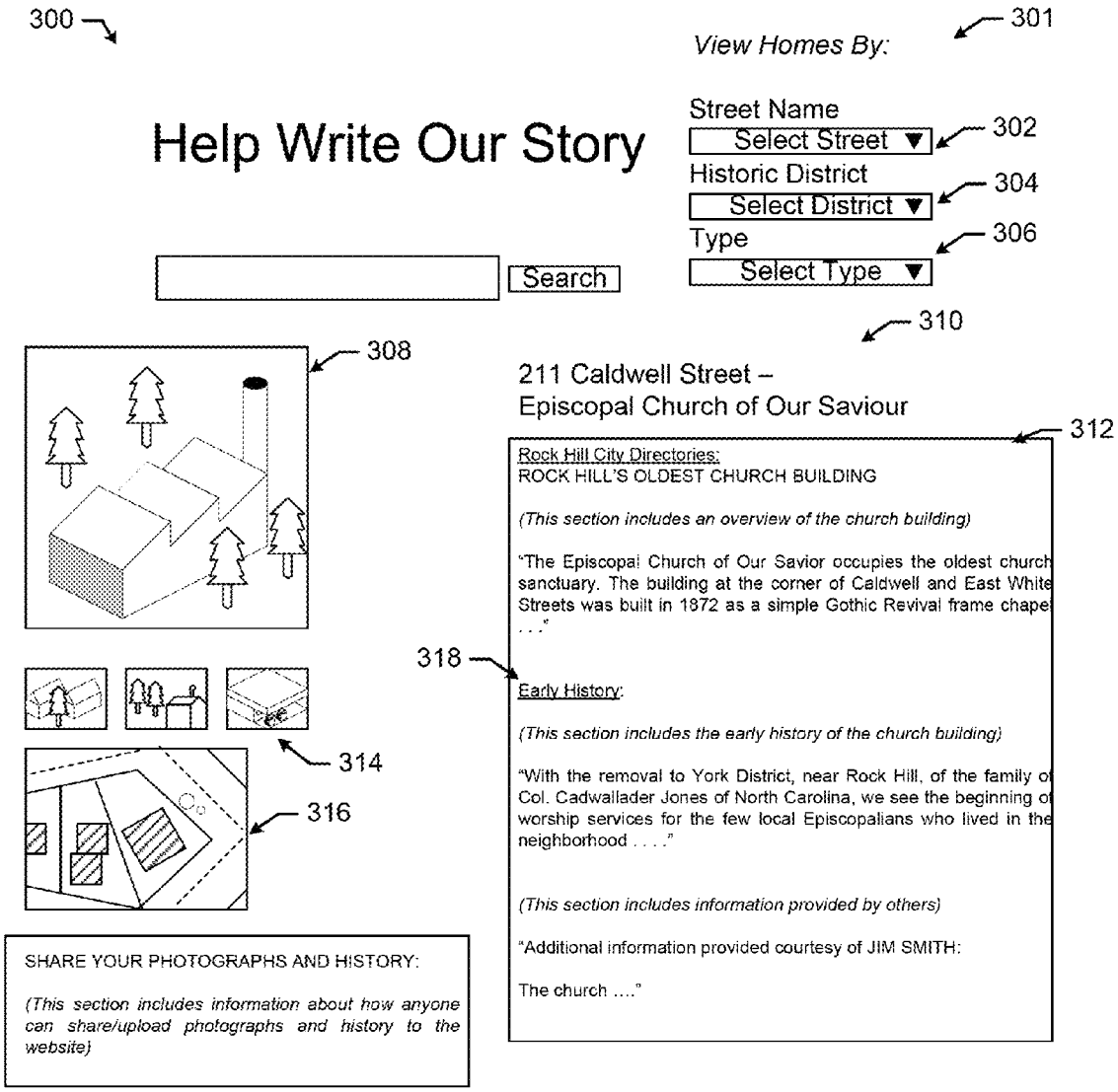
FIG. 3 is an example of a graphical interface for retrieving address-based historical records in accordance with an embodiment of the present invention.

FIG. 3 is an example of a graphical user interface ("GUI") 300 for retrieving or storing/updating address-based historical data in accordance with an embodiment of the present invention. The GUI 300 is presented after the user searches, enters and/or selects an address of interest. Thus, the GUI 300 of FIG. 3 is illustrating results of an inputted address (as previously discussed by block 118 of FIG. 1) and displays the address and a title of the property 310.

The GUI 300 may have a search section 301 that allows a user to enter or select an address. The search section 301 may have a box for the user to type in the address or location or the search section 301 may have selectable options (e.g., drop boxes) to select an address or particulars of the address to narrow his search. FIG. 3 illustrates the latter embodiment where the search section 301 has selectable drop down boxes, including a drop box 302 for the user to select the street name, a drop box 304 for the user to select the historic district, and a drop box 306 to select the type. Other options or drop boxes are also possible, such as selectable options relating to what country, state, city or area the user wishes to search. Another option may be to present art interactive map that a user can zoom and pan to select art address of interest.

The GUI 300 may also present various data related to the input address. For example, the GUI 300 may present pictures 314 and one of the pictures 308 may be enlarged. The pictures 314 may be various pictures about the structure, as previously discussed with regard to FIG. 2. The GUI 300 may further include a map 316 illustrating the location of the inputted address. The map 316 could be a current map or a historical map illustrating the structure in the past. The GUI 300 also may present textual information 312, 318 about the address including the evolution of structures at the address location, historical information about people associated with the address (including any genealogy information), etc. In the example shown in FIG. 3, the textual information 312, 318 for an Episcopal Church states:

"Rock Hill City Directories:
ROCK HILL'S OLDEST CHURCH BUILDING
The Episcopal Church of Our Saviour, while not the oldest congregation in Rock Hill, occupies the oldest church sanctuary. The building at the corner of Caldwell and East White Streets was built in 1872 as a simple Gothic Revival frame chapel with board and batten siding. It has undergone a number of changes over the years. In 1895, the vestibule was added. In 1908, the greatest alterations took place, when the transepts, chancel, and tower were added and the church was encased in brick. The two-story tower has a crenellated parapet, buttresses at the corners, and pointed arched openings with wood shutters. The first stained glass windows were added at this time as well. Additional impressive windows have been placed in the church over the years. In 1922 the Parish Hall was constructed adjacent to the sanctuary along Oakland Avenue. This building contained the first indoor gymnasium available to the public in Rock Hill. In 1963, the nave of the church was enlarged on both sides and the front porch was added. The Parish hall was demolished in 1990 and a new one erected on the same site, with space for classrooms, offices, and indoor and outdoor gathering spaces.

The Episcopal Church of Our Saviour retains its Gothic Revival character even though it has undergone extensive changes over the years, and it contributes to the varied and rich church architecture in the downtown area. The building is listed in the National Register of Historic Places as part of the Rock Hill Downtown Historic District.

Early History:

With the removal to York District, near Rock Hill, of the family of Col. Cadwallader Jones of North Carolina, we see the beginning of worship services for the few local Episcopalians who lived in the neighborhood. Mrs. Jones, who was born Annie Isabella Iredell, daughter of Gov. James Iredell of North Carolina, issued the first call to service in the name of the Episcopal denomination in 1857, the year of the family's arrival there. In 1858 the Joneses built their home, Mount Gallant, east of Rock Hill on a tract of land joining the lands of David Hutchison, the widow Rebecca Hart, Nathan Kimbrell, Stephen McCorkle, James Moore, Mrs. Cynthia Sturgis Neely, and others. Colonel Jones and his late father, also named Cadwallader Jones, had been buying York District land since about 1813-16, even though they themselves continued to live in North Carolina, at least until 1857. Mount Gallant|| became the principal ante-bellum scene of elaborate entertainments and dances in the Rock Hill area. The local inhabitants all coveted invitations to the Jones plantation, which, at two thousand acres, was the largest farming operation in the area. Anglican services were first held in the drawing-room at Mount Gallant and then at the building of the Rock Hill Academy, in White's pasture. On every fifth Sabbath the Rev. J. D, Gibson, rector of the Church of the Good Shepherd, at Yorkville, would come to Rock Hill to read the services from the Book of Common Prayer. The Joneses were ably assisted by the family of Halcott Pride Green, who lived near Land's Ford. [Along the Lands Ford Road, Vol. I and HRH]"

It should be noted that the GUI 300 can include any other features and other GUIs can also exist to display results of the search.

Other examples of the present disclosure will also now be described.

By way of one example, if a user wants to view information about the house their grandparents lived in, the user can use a web-based map search tool to find the house or look it up specifically by the address on the database. If the user already knows his grandmother's home is located at 123 Oakland Ave., City A, S.C., the user enters such address in the GUI which is then transmitted to the server, as previously discussed. If the user, however, can't recall the address but remembers that the house was on a corner of Oakland Ave., in the third or fourth block of City A, S.C., the user may use a web-based maps feature to visually locate the house to obtain the address. If the house is not standing or someone doesn't have access to web-based maps, then a more conventional method may be used. In either case, the user starts the search by first finding the structure on the web-based map. Once the structure is visually located, the web-based map provides an address associated with the structure. Using the address, the user can then find the house listed in the database via that location/address. The server then retrieves the information in the records database associated with the address. The retrieved information may include historical pictures of the structure(s) at the location, a history of the neighborhood, a history if known of the builder, developer, etc., persons/families associated with the structure, other submissions and any other information in entries in the records database associated with the address.

Figure 4:
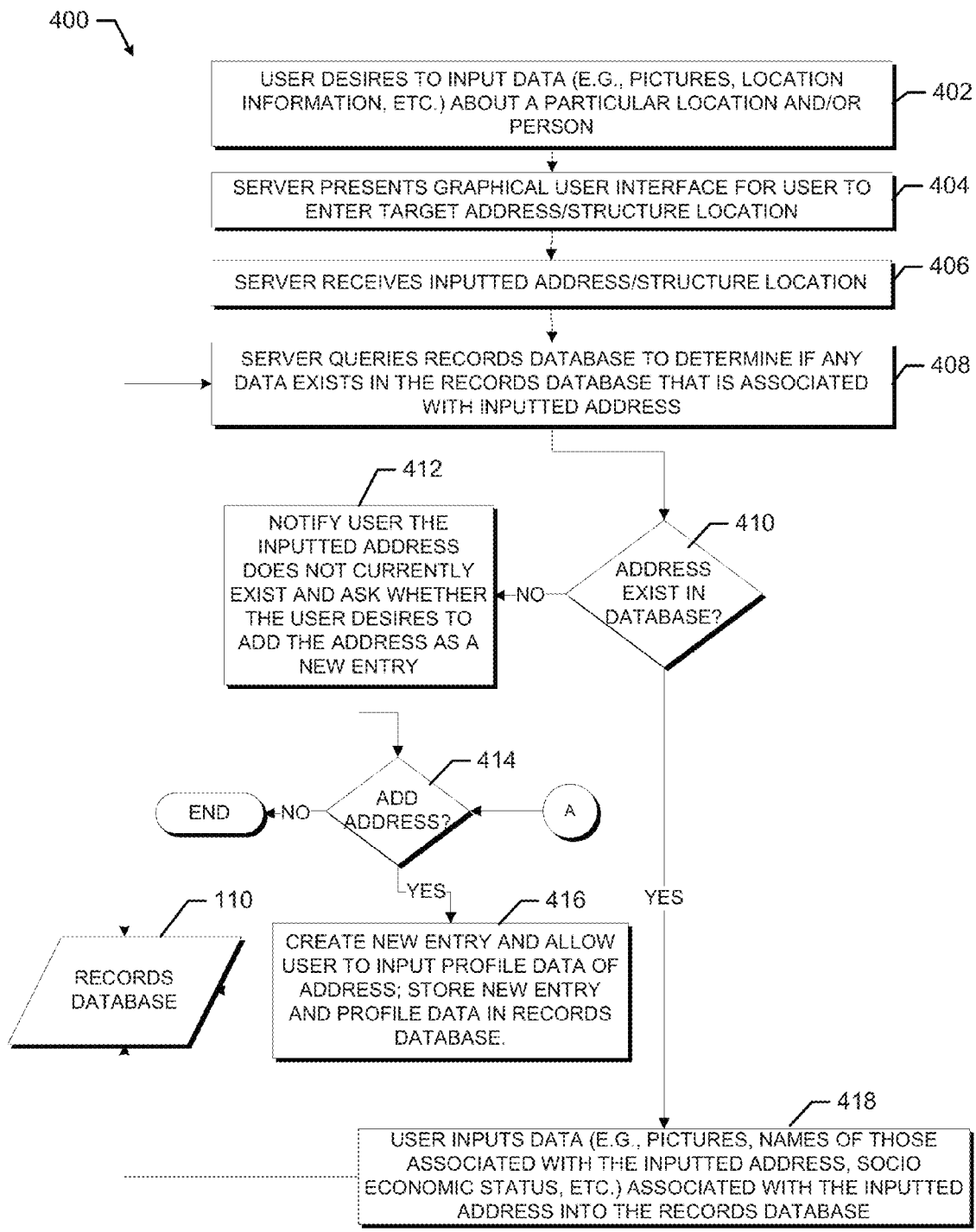
FIG. 4 is a flowchart of an example of a method for uploading address-based historical records to a records database in accordance with an embodiment of the present invention.

FIG. 4 is a flowchart of an example of a method 400 for uploading address-based historical records to a records database 110 in accordance with an embodiment of the present invention. In FIG. 4, a user desires to input data (e.g., pictures, location information, etc.) about a particular location or address into records database 110, as illustrated by block 402. In block 404, a graphical user interface is presented for the user to enter a target address/structure location, and a query is performed on the records database 110 to determine if any data exists in the records database that is associated with the inputted address, as illustrated in block 408. This may be done similar to that as previously discussed by blocks 106-108 of FIG. 1. The records database 110 of FIG. 4 may be the same records database of FIGS. 1-2.

In block 410, if the address exists in the records database, the method 400 may proceed to block 418, as will be discussed below; otherwise, the method 400 may proceed to block 412. In block 412, the user is notified that the inputted address does not currently exist in the records database 110 and the server presents a GUI to the user asking if the user desires to add the inputted address as a new entry into the records database 110. If the user desires to add the new address entry, the method 400 may proceed to block 414 (as well as reference point "A" from FIG. 1) where the server determine whether input has been received indicating that the user wants to add the address. The user may provide such indication by clicking a selectable "Yes" or "Create New Entry" button on the GUI. If the determination is that the user does not wish to add the inputted address as a new entry (e.g., by clicking "Cancel" or "No"), the method 400 may end. Otherwise, if the determination is that the user wishes to add the inputted address as a new entry, the method 400 may continue to block 416.

In block 416, a new address entry is created in response to receiving a positive indication from the user that the user wishes to create the new entry. A new entry is then started in the records database 110, and the user enters data via a GUI into such new entry, such as profile data. The profile data may include the address itself, a name of the structure at the address, and other basic information about the address input. This information is stored and archived so that any new search may contact this profile information so that future users can search and identify this address as one that now exists in the records database 110. After the new entry is created, the method may continue to block 418.

In block 418, data associated with the address may be inputted. This data may be substantially the same as that previously described by FIGS. 1-2. As previously discussed, the data may be any data that is associated with the address, such as photographs, documents, local histories, genealogy, memories submitted by individuals including genealogy associated with that particular structure, textual historical information, artisan information, other addresses that are related to the inputted address, etc. Regardless, the inputted data may be then stored into the records database 110 and archived so that such data is available for display to future users searching for such address.

It should be noted that any of the methods may be specified to be performed only for authorized users. In this regard, a user provides authorization credentials to be authorized to perform operations in the system.

Figure 5:
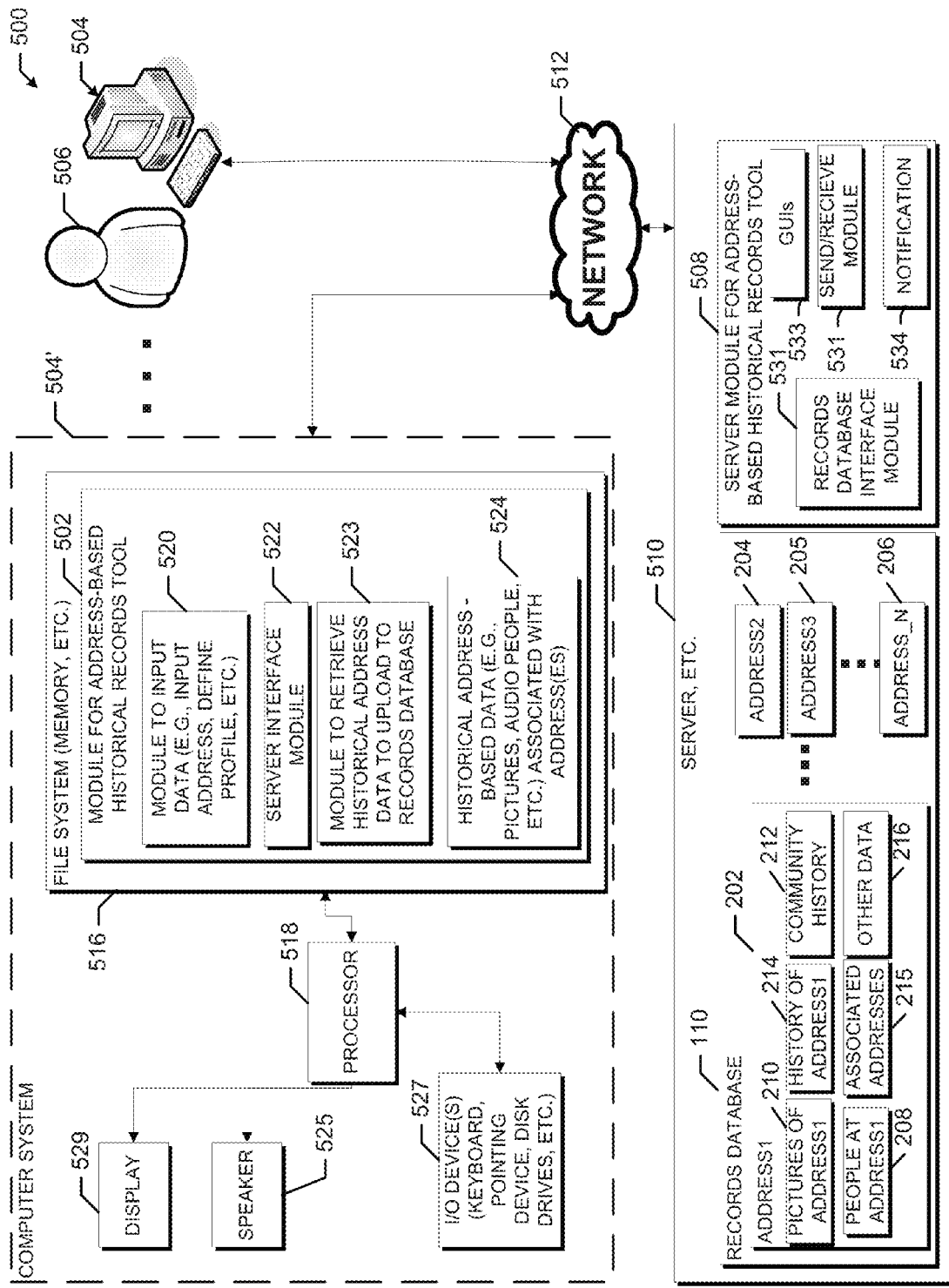
FIG. 5 is a block schematic diagram of a system of address-based historical records management in accordance with an embodiment of the present invention.

FIG. 5 is a block schematic diagram of a system of address-based historical records management in accordance with an embodiment of the present invention. The system 500 may include a module for address-based historical records tool (hereinafter "addressed-based tool module") 502 operable on a computer system 504, or similar device of a user 506 or client. Alternatively, or in addition to the addressed-based tool module 502 on the user's computer system 504 or client, the system 500 may include a addressed-based tool module 508 operable on a server 510 (hereinafter "server addressed-based tool module") and accessible by the user 506 or client 504 via a network 512. The methods 100, 400 may be embodied in or performed by the addressed-based tool module 502 and/or the server addressed-based tool module 508. For example, the method 100 may be performed by the addressed-based tool module 502. In another embodiment of the invention, the methods 100, 400 may be performed by the server addressed-based tool module 508. In a further embodiment of the present invention, some of the features or functions of the methods 100 and/or 400 may be performed by the addressed-based tool module 502 on the user's computer system 504 and other features or functions of the methods 100, 400 may be performed on the server addressed-based tool module 508.

A records database 110 may be operable on the server 510 or may be operable separate from the server 510 and may be communicable by users 506 or participants using their respective computer systems 504 or clients. The records database 110 may be the same as previously discussed in FIG. 2 and may include the components of 208-216 as previously discussed with regard to FIGS. 1-4.

The network 512 may be the Internet, a private network or other network. Each computer system 504' may be similar to the exemplary computer system 504 and associated components illustrated in FIG. 5.

The addressed-based tool module 502 and/or 508 may be a self contained system with embedded logic, decision making, state based operations and other functions that may operate in conjunction with collaborative applications, such as web browser applications, email, IM, blogs, wikis, phone application and any other application which can be used to communicate with an intended recipient. The self-contained system may allow businesses, individuals, services, locations, and the like to provide an address-based historical records tool.

The addressed-based tool module 502 may be stored on a file system 516 or memory of the computer system 504. The addressed-based tool module 502 may be accessed from the file system 516 and run on a processor 518 associated with the computer system 504.

The addressed-based tool module 502 may include a module to input data 520 (hereinafter "input data module"). The input data module 520 allows the user to input various historical address-based data 524 (e.g., profile information, pictures, address information, historical information about the address, etc.) using an application via the computer system 504. The input data module 520 may be accessed or activated whenever the user desires to upload data to the records database and may call other modules such as the applications or GUIs as described below. The input data module 520 also allows input of other information, such as searching preferences, passwords and the like. The input data module 520 may communicate with any module on the server 510.

The addressed-based tool module 502 may also include a module to interface with the server 522 (hereinafter "server interface module"). The server interface module 522 allows for a user to interface with modules on the server 510. The server interface module 522 communicates with the server 510 to upload and/or download any requested item. As such, the computer 504 may act as both a requesting device and an uploading device.

The addressed-based tool module 502 may also include a module to retrieve historical address-based data to upload to the records database 523 (hereinafter "retrieval module"). The retrieval module 523 allows for a user to retrieve historical address-based data from the server 510 when the user has located an address that the user would like to research. The retrieval module 523 communicates with the server 510 to download any requested item via, the server interface module 522. After retrieval of historical data, the retrieval module 523 may store the retrieved data in the memory allocated for the historical address-based data 524 for future retrieval.

The user computer system 504 may also include a display 529 and a speaker 525 or speaker system. The display 529 may present applications for electronic communications and/or artifact creation/uploading/downloading/etc. and may perform controlling and display of the alias information as described herein. Any GUIs associated with the addressed-based tool module 508 and application may also be presented on the display 529. The speaker 525 may present any voice or other auditory signals or information to the user 506.

The user computer system 504 may also include one or more input devices, output devices or combination input and output device, collectively I/O devices 527. The I/O devices 527 may include a keyboard, computer pointing device or similar means to control operation of applications and interaction features described herein. The I/O devices 527 may also include disk drives or devices for reading computer media including computer-readable or computer-operable instructions.

The server addressed-based tool module 508 may include a records interface module 530. The records interface module 530 may be configured to perform searching of the records database, as well as initiate, upload, download, manage, process and/or complete electronic communications with the records database 110 and the user's computer 504. The records interface module 530 is configured to communicate with any of the modules in the addressed-based tool module 502 on the users computer 504. The records interface module 530 receives requests from the user's computer and then performs any queries and returns results back to the computer 504 using the send/receive module 531.

The send/receive module 531 may also reside on the server addressed-based tool module 508. The send/receive module 531 allows data to be sent between the user's computer 504 and the server 110. This may include the handling of queries, data from the records database 110, etc. as well as the appropriate delivery to the correct module.

The server addressed-based tool module 508 may further include GUIs 533. The server addressed-based tool module 508 may present one or more predetermined GUIs to permit the user to define preferences and/or aliases associated with identities of end users or any other information and/or settings. The GUIs may be predetermined and/or presented in response to the user indicating the user would like to enter information and/or settings. The predetermined GUIs may be generated by the server addressed-based tool module 508 and may be presented on the display 529 of the computer system 504.

The server addressed-based tool module 508 may further include a module for notifications 534, which will provide notifications to the user when appropriate, such as when an inputted address has no data on the records database 110.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or arty suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for address-based research, comprising:
    receiving, at a server, input of an address that (1) a user wishes to research and (2) was associated with at least one historical person;
    in response to receiving the inputted address, querying using only the inputted address, from the server, a records database to determine if any data associated with the inputted address exists in the database, the database comprising:
        names of the at least one historical who was associated with the address;
        historical images and historical documents associated with real property at the address; and
        community-related historical information about the address;
    determining if any data associated with the inputted address exists in the records database based on the query using only the inputted address; and
    in response to identifying a database entry containing the determined data associated with the inputted address in the database:
        retrieving the determined data contained in the database entry; and
        presenting an interactive graphical user interface so that the determined data about the inputted address from the database entry is presented to the user.

2. The method of claim 1, wherein the querying the records database comprises querying an index, wherein the index comprises a listing of addresses such that when an address is inputted, the inputted address is compared with addresses that are stored in the index.

3. The method of claim 2, wherein, in response to locating an address in the index, identifying a database entry corresponding to the indexed address.

4. The method of claim 1, wherein the querying the records database comprises searching the database with at least a portion of the inputted address with strings of text stored in entries of the database.

5. The method of claim 1, further comprising in response to determining no data is associated with the inputted address exists in the database, allowing the user to create a new entry in the database.

6. The method of claim 5, further comprising:
    receiving input from the user to create a new entry associated with the inputted address;
    creating the new entry in the database;
    presenting a graphical user interface to allow the user to upload data to the new entry; and
    indexing the inputted address in the index.

7. The method of claim 1, further comprising presenting, from a server, a graphical user interface to allow a user to input one or more addresses in researching history of a person.

8. The method of claim 1, further comprising receiving the address information from a GPS-enabled device such that while the user is located at the address, the GPS-enabled device obtains and transmits the location of the user to the server.

9. A system for address-based research comprising:
a records database;
a computer hardware processor in communication with the records database, the processor configured for:
receiving input of an address in researching history of historical persons;
in response to receiving the address input, querying, using only the inputted address, the records database to determine if any historical information is associated with the address exists in the records database, the database comprising:
names of any of the historical persons who were associated with the address;
historical pictures of the address; or
historical community information about the address;
in response to locating address data about the inputted address in the database, retrieving the address data and outputting the address data.

10. The system of claim 9, wherein in response to determining no data is associated with the inputted address exists in the database, the processor is further configured for allowing the user to create a new entry in the database.

11. The system of claim 10, wherein the processor is further configured for:
receiving input from the user to create a new entry associated with the inputted address;
creating the new entry in the records database;
presenting a graphical user interface to allow the user to upload data to the new entry; and
indexing the inputted address in the index.

12. The system of claim 9, wherein the processor is further configured for receiving the address information from a GPS-enabled device such that while the user is located at the address, the GPS-enabled device obtains and transmits the location of the user to the server.

13. The system of claim 9, wherein the querying the records database comprises querying an index, wherein the index comprises a listing of addresses such that when an address is inputted, the inputted address is compared with addresses that are stored in the index.

14. The system of claim 9, wherein, in response to locating an address in the index, the processor is further configured for identifying a database entry corresponding to the indexed address.

15. The system of claim 9, wherein the querying the records database comprises searching the database with at least a portion of the inputted address with strings of text stored in entries of the database.

16. A method for address-based research, comprising:
receiving, at a computing device, only an input of an address that a user wishes to research and that has historical information associated therewith;
in response to receiving the inputted address, querying, using the inputted address, a records database to determine if any data associated with the inputted address exists in the database, the database comprising at least one of:
names of at least one historical person who was associated with the address;
historical images and historical documents associated with real property at the address; and
community-related historical information about the address;
determining if any data associated with the inputted address exists in the records database based on the query using only the inputted address; and
in response to identifying a database entry containing the determined data associated with the inputted address in the database:
retrieving the determined data contained in the database entry; and
presenting a graphical user interface so that the determined data about the inputted address from the database entry is presented to the user.

* * * * *